United States Patent
Kim

Patent Number: 5,771,076
Date of Patent: Jun. 23, 1998

[54] DEVICE FOR GENERATING A VERTICAL SYNCHRONIZING SIGNAL

[75] Inventor: Young-Chul Kim, Seoul, Rep. of Korea

[73] Assignee: Samsung Electronics Co., Ltd., Suwon, Rep. of Korea

[21] Appl. No.: 729,233

[22] Filed: Oct. 9, 1996

[30] Foreign Application Priority Data

Oct. 10, 1995 [KR] Rep. of Korea .................. 95-34694

[51] Int. Cl.[6] ............................................. H04N 5/06
[52] U.S. Cl. .................................. 348/524; 348/521
[58] Field of Search .................................. 348/521, 524, 348/522, 523, 525, 536, 547, 548, 500; 358/148, 150, 153, 154; H04N 9/45, 5/06, 5/08

[56] References Cited

U.S. PATENT DOCUMENTS

| | | | |
|---|---|---|---|
| 4,224,639 | 9/1980 | Belisomi | 348/548 |
| 4,858,008 | 8/1989 | Sieben et al. | 348/526 |
| 5,341,217 | 8/1994 | Florsek | 348/525 |
| 5,635,988 | 6/1997 | Hush | 348/521 |

Primary Examiner—Christopher C. Grant
Attorney, Agent, or Firm—Jones & Volentine, L.L.P.

[57] ABSTRACT

The present invention relates to a device which generates a vertical synchronizing signal of video signals according to digital methods. The present invention is composed of a counter for receiving a first input signal and a system clock for counting the number of system clock cycles, and for producing a 9-bit counting signal; a first comparator for receiving the 9-bit counting signal, and comparing it with an upper limit number, and producing an output signal; a second comparator for receiving the 9-bit counting signal, and comparing it with a lower limit number, and producing an output signal; a feedback loop circuit for receiving the first input signal, the output signal of the first comparator, and the output signal of the second comparator, and producing a feedback signal to prevent outputs of the counter from exceeding or going below the upper and lower limit numbers, respectively; and a controller for receiving the most significant bit (MSB) of the 9-bit counting signal, system clocks, and a second input signal, and producing a vertical synchronizing signal in case the MSB is a low logic value when the counter counts system clock cycles in the descending direction from the upper limit number. The present invention permits the easy correction of a vertical synchronizing signal by providing a device which generates a vertical synchronizing signal of video signals by digital methods in correspondence to users' requests, and it can be not only to advance stability in the process by utilizing digital circuits, but also to uses lower consumption-current than conventional circuits.

17 Claims, 6 Drawing Sheets

DEVICE FOR GENERATING A VERTICAL SYNCHRONIZING SIGNAL

BACKGROUND OF THE INVENTION

(1) Field of the Invention

The present invention relates in general to a device for generating a video signal, more particularly, to a device which generates a vertical synchronizing signal of a video signal according to digital methods.

(2) Description of the Related Art

As applications of multi-media technology expand, video signals typically used in broadcast television are often used with a computer monitor. In this case, since formats of video signals between a television screen and a computer monitor are different, conventional systems must connect the television to the computer using an interface. In order to connect with such an interface, the analog video signals must be converted into digital video signals, and then changed from a format used for a television screen into a format used with a computer monitor. A vertical synchronizing signal of a video signal is then generated.

When a vertical synchronizing signal is generated by an analog method, the conventional system has problems in which an IC fabrication process is unstable, and a circuit is high current-consumption. Also, it is difficult to correct a pulse width of a vertical synchronizing signal when a user wants to correct a vertical synchronizing signal.

In addition, the conventional system uses the device generating a digital timing signal, which needs a lot of digital circuits, since 525 horizontal synchronizing lines per frame and 2 vertical synchronizing lines are used in the standard NTSC (National Television System Committee) format used, and there is no base point synchronizing a vertical synchronizing signal because it is synchronized by a horizontal synchronizing signal.

SUMMARY OF THE INVENTION

It is an object of the present invention to solve the above-mentioned problems of the conventional system.

It is for users to correct easily a vertical synchronizing signal by providing a device which generates a vertical synchronizing signal of video signal by digital methods.

Another object is to provide a device for generating a vertical synchronizing signal with a more stable in IC process and with lower current consumption, by implementing the present invention with digital circuits.

To achieve these objects, according to a preferred embodiment of the present invention, a device for generating a vertical synchronizing signal composed of a counter for receiving a first input signal, system clock, counting a number of system clocks, and producing a 9-bit counting signal; first comparator for receiving the 9-bit counting signal, comparing with an upper limit number, and producing an output signal; second comparator for receiving the 9-bit counting signal, comparing with a lower limit number, and producing an output signal; feedback loop circuit for receiving the first input signal, the output signal of the first comparator, and the output signal of the second comparator, and producing a feedback signal to prevent outputs of the counter from rotating; and controller for receiving the most significant bit (MSB) of the 9-bit counting signal, system clocks, and a second input signal, and producing a vertical synchronizing signal in case the MSB has a low logic value when the counter counts system clocks in the backward direction from the upper limit number.

BRIEF DESCRIPTION OF THE DRAWINGS

The foregoing and other objects and advantages of the present invention will become more apparent from the detailed description of the preferred embodiments of the present invention given below with reference to the accompanying drawings in which.

DETAILED DESCRIPTION OF THE PREFERRED EMBODIMENT

The present invention will be described in detail as set forth in the preferred embodiments illustrated in FIGS. 1–6. Although these embodiments depict the invention as in its preferred application to a device for generating a vertical synchronizing signal, it should be readily apparent that the invention has equal application to any type or configuration of device that encounters the same or similar problems.

Figure 1:
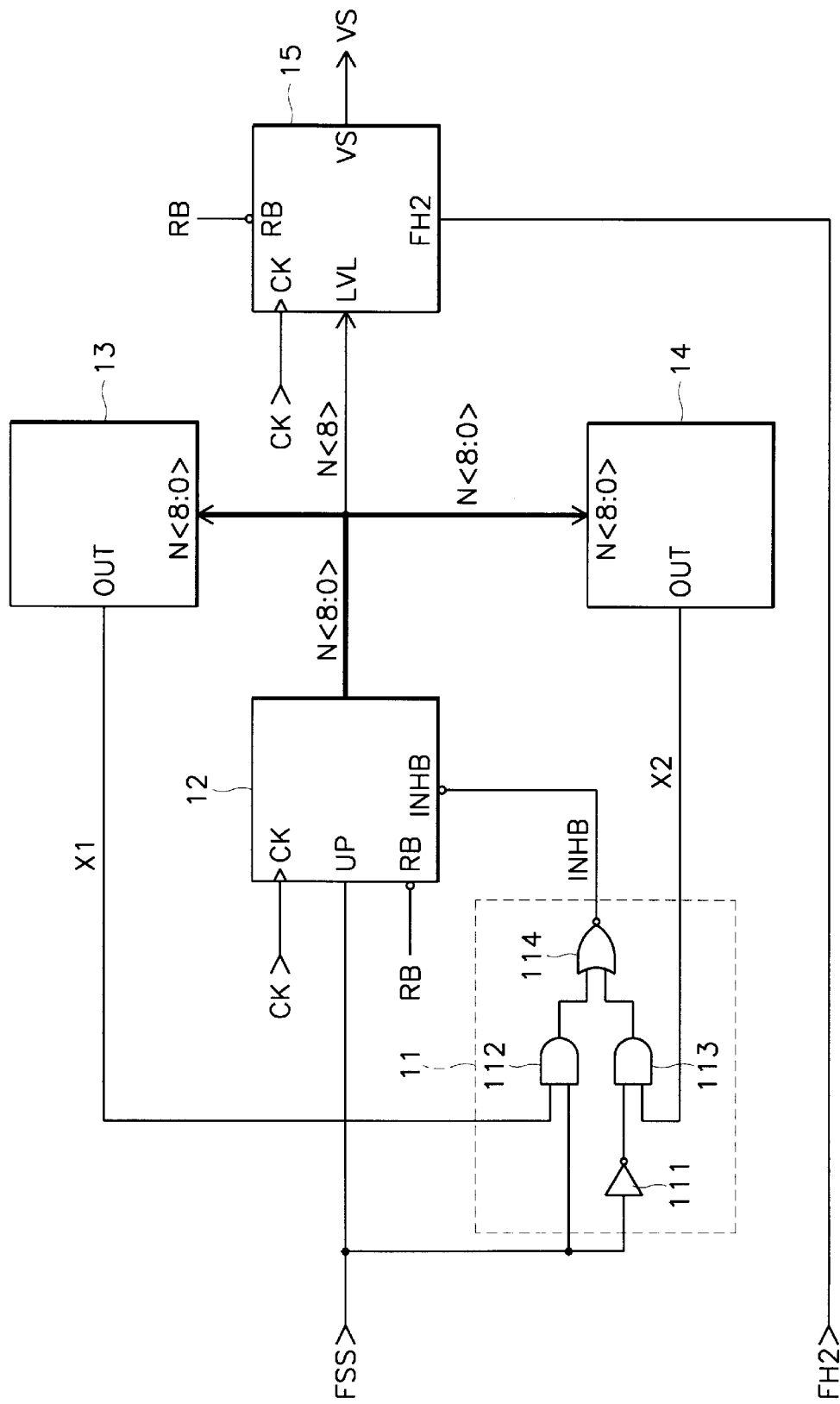
FIG. 1 is a block diagram illustrating a device for generating a vertical synchronizing signal according to a preferred embodiment of the present invention.

As shown in FIG. 1, a device for generating a vertical synchronizing signal in accordance with the present invention is composed of counter 12 for receiving a first input signal (FSS), and a system clock (CK). Counter 12 counts the number of system clocks and produces a 9-bit counting signal (N<8:0>). A first comparator 13 is included for receiving the 9-bit counting signal (N<8:0>), and comparing it with an upper limit number (e.g., number "511"), and producing an output signal in response thereto. A second comparator 14 is also provided for receiving the 9-bit counting signal (N<8:0>), comparing it with a lower limit number (e.g., number "0"), and producing an output signal. A feedback loop circuit 11 is provided for receiving the first input signal (FSS), the output signal of the first comparator 13, and the output signal of the second comparator 14, and producing a feedback signal (INHB) to prevent outputs of the counter 12 from rolling over (e.g., from the maximum value to the minimum value). A controller 15 is provided for receiving the MSB (N<8>) of the 9-bit counting signal (N<8:0>), system clock (CK), and a second input signal (FH2), and producing a vertical synchronizing signal (VS) in case the MSB (N<8>) is a low logic value when the counter 12 counts system clocks in the backward direction from the upper limit number.

Figure 2A:
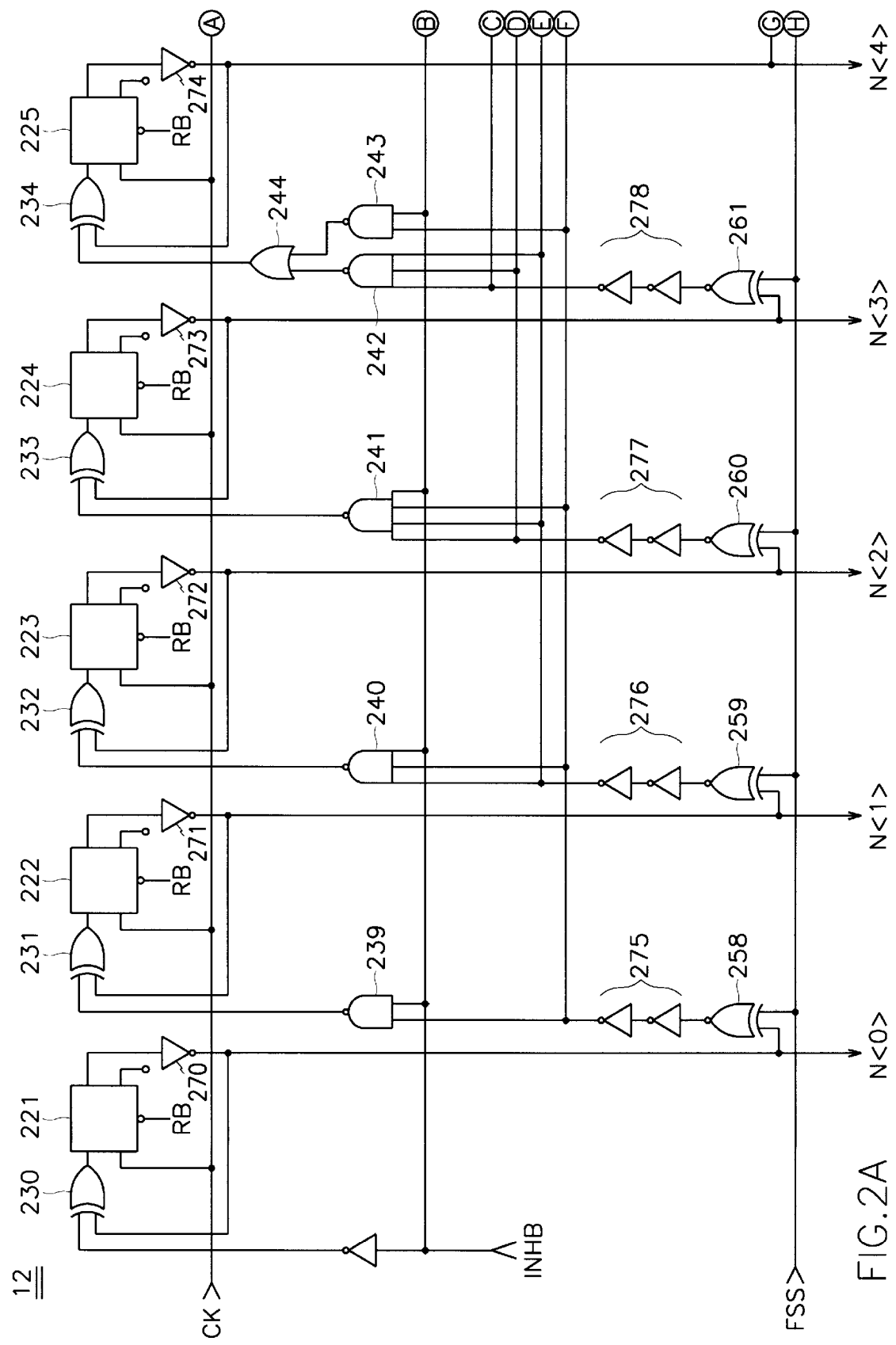
FIGS. 2A and 2B are circuit diagrams illustrating a 9-bit up/down counter of a device for generating a vertical synchronizing signal according to a preferred embodiment of the present invention.
Figure 2B:
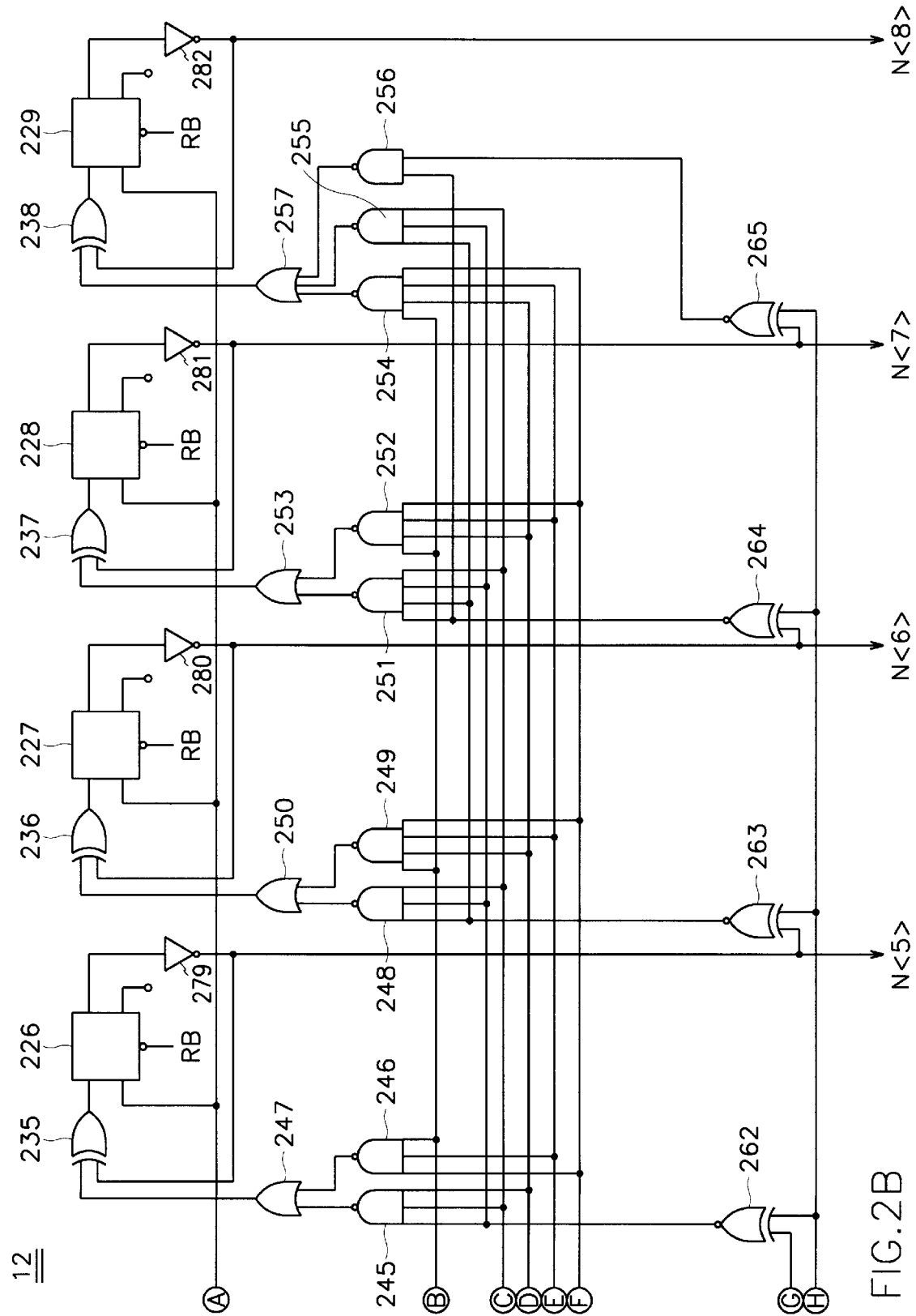

Also, as shown in FIGS. 2A and 2B, the counter 12 as a 9-bit up/down counter, is composed of multiple reset flip-flops with an input terminal, a clock terminal, a reset terminal, and an output terminal, and is composed of multiple exclusive OR gates, multiple OR gates, multiple AND gates, and multiple exclusive NAND gates.

A first reset flip-flop 221 receives a system clock (CK) into a clock terminal, receives a reset signal (RB) into a reset terminal, receives an output of a first exclusive OR gate 230 into an input terminal, and produces an output signal from an output terminal. The first exclusive OR gate 230 receives an inverted output of the feedback signal (INHB) and an inverted output of the first reset flip-flop 221. An inverted output of the first reset flip-flop 221 from inverter 270 is to be a first bit (N<0>) of the 9-bit counting signal.

A second reset flip-flop 222 receives a system clock (CK) into a clock terminal, receives a reset signal (RB) into a reset terminal, receives an output of a second exclusive OR gate 231 into an input terminal, and produces an output signal from an output terminal. The second exclusive OR gate 231 receives an output of a first NAND gate 239 and an inverted output of the second reset flip-flop 222 through inverter 271. The first NAND gate 239 receives the feedback signal (INHB) and the output of the first exclusive NOR gate 258 (through buffer 275) which receives the inverted output of first reset flip-flop 221 and the first input signal (FSS). An inverted output of the second reset flip-flop 222 is to be a second bit (N<1>) of the 9-bit counting signal.

A third reset flip-flop 223 receives a system clock (CK) into a clock terminal, receives a reset signal (RB) into a reset terminal, receives an output of a third exclusive OR gate 232 into an input terminal, and produces an output signal from an output terminal. The third exclusive OR gate 232 receives an output of a second NAND gate 240 and an inverted output of the third reset flip-flop 223. The second NAND gate 240 receives the feedback signal (INHB), the output of the first exclusive NOR gate 258, and an output of a second exclusive NOR gate 259 (through buffer 276) which receives the inverted output of second reset flip-flop 222 through inverter 271 and the first input signal (FSS). An inverted output of the third reset flip-flop 223 output by inverter 272 is to be a third bit (N<2>) of the 9-bit counting signal.

A fourth reset flip-flop 224 receives a system clock (CK) into a clock terminal, receives a reset signal (RB) into a reset terminal, receives an output of a fourth exclusive OR gate 233 into an input terminal, and produces an output signal by an output terminal. The fourth exclusive OR gate 233 receives an output of a third NAND gate 241 and an inverted output of the fourth reset flip-flop 224 from inverter 273. The third NAND gate 241 receives the feedback signal (INHB), the output of the first exclusive NOR gate 258, the output of a second exclusive NOR gate 259, and an output of third exclusive NOR gate 260 which receives the inverted output of third reset flip-flop 223 and the first input signal (FSS). An inverted output of the fourth reset flip-flop 224 is to be a fourth bit (N<3>) of the 9-bit counting signal.

A fifth reset flip-flop 225 receives a system clock (CK) into a clock terminal, receives a reset signal (RB) into a reset terminal, receives an output of a fifth exclusive OR gate 234 into an input terminal, and produces an output signal from an output terminal. The fifth exclusive OR gate 234 receives an output of a first OR gate 244 and an inverted output of the fifth reset flip-flop 225 from inverter 274. The first OR gate 244 receives an output of a fourth NAND gate 242 and an output of a fifth NAND gate 243. The fifth NAND gate 243 receives the feedback signal (INHB) and the output of the first exclusive NOR gate 258. The fourth NAND gate 242 receives the output of a second exclusive NOR gate 259, the output of third exclusive NOR gate 260, and an output of fourth exclusive NOR gate 261 (through buffer 278) which receives the inverted output of fourth reset flip-flop 224 and the first input signal (FSS). An inverted output of the fifth reset flip-flop 225 is to be a fifth bit (N<4>) of the 9-bit counting signal.

A sixth reset flip-flop 226 receives a system clock (CK) into a clock terminal, receives a reset signal (RB) into a reset terminal, receives an output of a sixth exclusive OR gate 235 into an input terminal, and produces an output signal from an output terminal. The sixth exclusive OR gate 235 receives an output of a second OR gate 247 and an inverted output of the sixth reset flip-flop 226 from inverter 279. The second OR gate 247 receives an output of a sixth NAND gate 245 and an output of a seventh NAND gate 246. The seventh NAND gate 246 receives the feedback signal (INHB), the output of the first exclusive NOR gate 258, the output of a second exclusive NOR gate 259. The sixth NAND gate 245 receives the output of third exclusive NOR gate 260, the output of fourth exclusive NOR gate 261, and an output of fifth exclusive NOR gate 262 which receives the inverted output of fifth reset flip-flop 225 and the first input signal (FSS). An inverted output of the sixth reset flip-flop 226 from inverter 279 is to be a sixth bit (N<5>) of the 9-bit counting signal.

A seventh reset flip-flop 227 receives a system clock (CK) into a clock terminal, receives a reset signal (RB) into a reset terminal, receives an output of a seventh exclusive OR gate 236 into an input terminal, and produces an output signal from an output terminal. The seventh exclusive OR gate 236 receives an output of a third OR gate 250 and an inverted output of the seventh reset flip-flop 227 from inverter 280. The third OR gate 250 receives an output of an eighth NAND gate 248 and an output of a ninth NAND gate 249. The ninth NAND gate 249 receives the feedback signal (INHB), the output of the first exclusive NOR gate 258, the output of a second exclusive NOR gate 259, the output of third exclusive NOR gate 260. The eighth NAND gate 248 receives the output of fourth exclusive NOR gate 261, the output of fifth exclusive NOR gate 262, and an output of sixth exclusive NOR gate 263 which receives the inverted output of sixth reset flip-flop 226 and the first input signal (FSS). An inverted output of the seventh reset flip-flop 227 from inverter 280 is to be a seventh bit (N<6>) of the 9-bit counting signal.

An eighth reset flip-flop 228 receives a system clock (CK) into a clock terminal, receives a reset signal (RB) into a reset terminal, receives an output of a eighth exclusive OR gate 237 into an input terminal, and produces an output signal from an output terminal. The eighth exclusive OR gate 237 receives an output of fourth OR gate 253 and an inverted output of the eighth reset flip-flop 228 from inverter 281. The fourth OR gate 253 receives an output of a tenth NAND gate 251, an output of a eleventh NAND gate 252. The eleventh NAND gate 252 receives the output of the first exclusive NOR gate 258, the output of the second exclusive NOR gate 259, the output of the third exclusive NOR gate 260, and the feedback signal (INHB). The tenth NAND gate 251 receives the output of the fourth exclusive NOR gate 261, the output of the fifth exclusive NOR 262, the output of the sixth exclusive NOR gate 263, and the output of the seventh exclusive NOR gate 264 which receives the inverted output of fourth reset flip-flop 224 and the first input signal (FSS). An inverted output of the eighth reset flip-flop 228 from inverter 281 is to be a eighth bit (N<7>) of the 9-bit counting signal.

A ninth reset flip-flop 229 receives a system clock (CK) into a clock terminal, receives a reset signal (RB) into a reset terminal, receives an output of a ninth exclusive OR gate 238 into an input terminal, and produces an output signal from an output terminal. The ninth exclusive OR gate 238 receives an output of fifth OR gate 257 and an inverted output of the ninth reset flip-flop 229 from inverter 282. The fifth OR gate 257 receives an output of a twelfth NAND gate 254, an output of a thirteenth NAND gate 255, an output of a fourteenth NAND gate 256. The twelfth NAND gate 254 receives the output of the first exclusive NOR gate 258, the output of the second exclusive NOR gate 259, the output of the third exclusive NOR gate 260, and the feedback signal (INHB). The thirteenth NAND gate 255 receives the output of the fourth exclusive NOR gate 261, the output of fifth exclusive NOR 262, and the output of sixth exclusive NOR gate 263. The fourteenth NAND gate 256 receives the output of the seventh exclusive NOR gate 264 and the eighth exclusive NOR gate 265 which receives an inverted output of the eighth reset flip-flop 228 and the first input signal (FSS). An inverted output of the ninth reset flip-flop 229 from inverter 282 is to be a ninth bit (N<8>) of the 9-bit counting signal. Also, each output terminal of the exclusive NOR gates (258 . . . 265) produces an output to increase an output-current through two inverted buffers.

Hence, the counter 12 receives system clock (CK) and the first input signal (FSS), it counts the number of system clock cycles in the forward direction (i.e., increasing the cumulative number) if the first input signal (FSS) is a low logic value, and it counts the number of system clocks in the backward direction (i.e., decreasing the cumulative number) if the first input signal (FSS) is a high logic value. When the feedback signal (INHB) is a high logic value, the counter 12 produces the 9-bit counting signal (N<8:0>), and when the feedback signal (INHB) is a low logic value, it stops counting and thus does not produce a 9-bit count signal.

The first comparator 13 receives the 9-bit counting signal (N<8:0>), compares it with a binary representation of number 511, and produces a high or low logic value.

The second comparator 14 receives the 9-bit counting signal (N<8:0>), compares with a binary representation of number 0, and produces a high or low logic value.

As shown in FIG. 1, feedback loop circuit 11 is composed of a first AND gate 112 for receiving the output of the first comparator 13, and the first input signal (FSS); a second AND gate 113 for receiving an inverted signal of the first input signal (FSS) and the output of the second comparator 14; a NOR gate 114 for receiving outputs of the two AND gates 112, 113, and for producing the feedback signal (INHB).

After receiving the first input signal (FSS), the counter 12 counts system clocks in the forward direction if the first input signal (FSS) is in a high logic state, and the counter 12 counts in the backward direction if the first input signal (FSS) is in a low logic state. The feedback signal (INHB) is a low logic value if an output of the first comparator 13 and the first input signal (FSS) are to be a high logic value, and if the first input signal (FSS) and an output of the second comparator 14 are to be a low logic value. Also, in such cases, the counter 12 stops counting.

In the event that the first input signal (FSS) is in the high logic state, and the output X1 of comparator 13 is also in the high logic state, counter 12 will stop counting. Similarly, if FSS is in the low logic state, and the output S2 from counter 14 is in the high logic state, counter 12 will stop counting. If either of these two conditions are not satisfied, counter 12 will continue to count the system clock cycles (CK).

Figure 3:
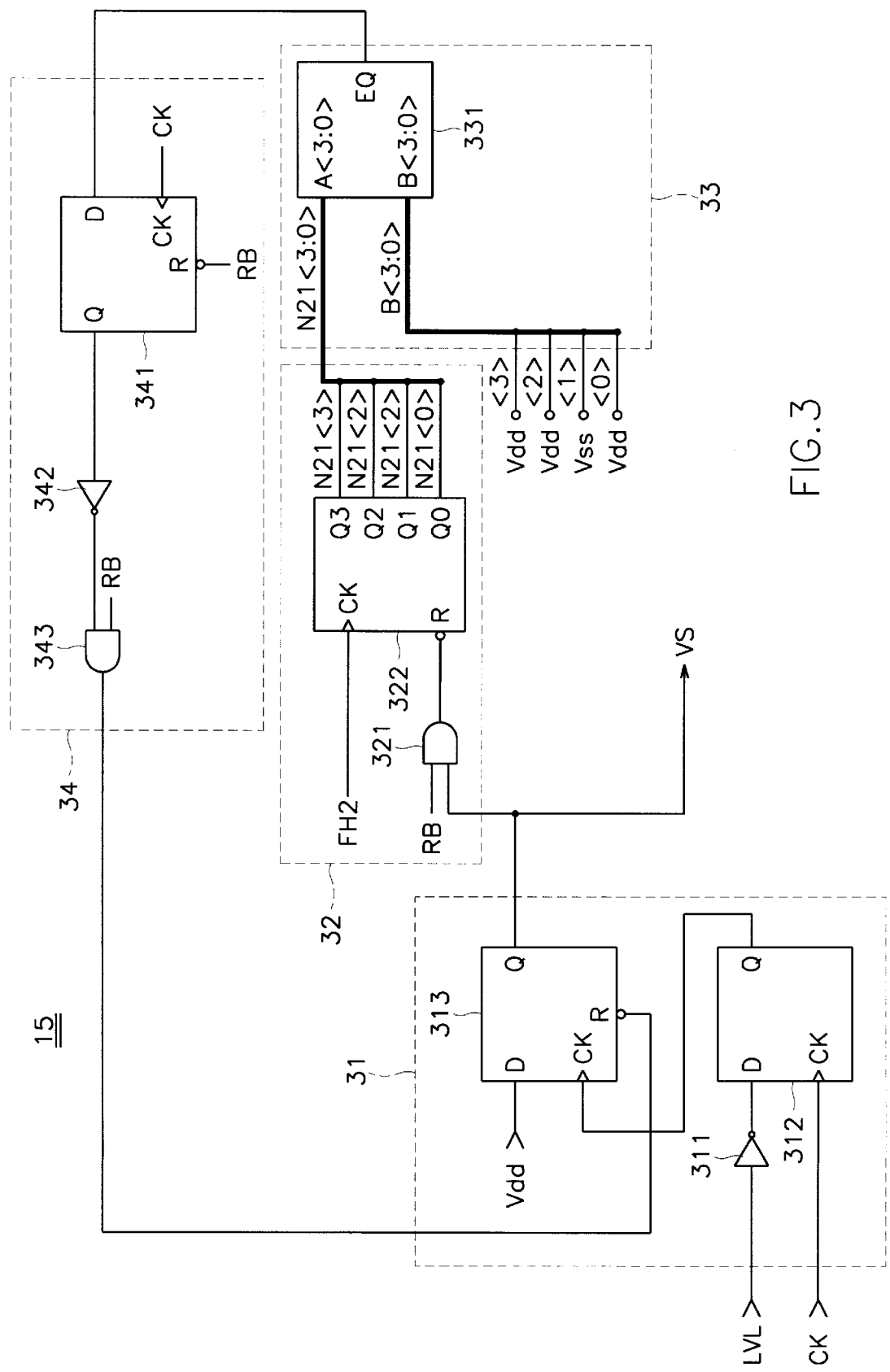
FIG. 3 is a circuit diagram illustrating controller of a device for generating a vertical synchronizing signal according to a preferred embodiment of the present invention.

As shown FIG. 3, the controller 15 is composed of an output circuit for vertical synchronizing signal 31, second counter 32, third comparator 33, and reset circuit 34.

The output circuit for vertical synchronizing signal 31 is composed of a first flip-flop 312 with an input terminal, an output terminal, and a clock terminal; and a first reset flip-flop 313 with an input terminal, an output terminal, a reset terminal, and a clock terminal.

The first flip-flop receives an inverted output of the MSB (N<8>) of the 9-bit counting signal (N<8:0>) into the input terminal, system clock (CK) into the clock terminal, produces a glitch-removed signal which is synchronized by the system clock (CK). The first reset flip-flop 313 receives a supply voltage (Vdd) into an input terminal, receives an output of the first flip-flop 312 into the clock terminal, receives an output of a reset circuit 34 into a reset terminal, and produces a vertical synchronizing signal which is synchronized by the output of the first flip-flop 312.

The first reset flip-flop 313 receives the MSB of the 9-bit counting signal, and produces a high logic value of the vertical synchronizing signal if the MSB of the 9-bit counting signal is a low logic value when the counter 12 counts the system clocks in the backward direction from the upper limit number 511.

The second counter 32 is composed of a first AND gate 321 for receiving an output of the output circuit for vertical synchronizing signal 31 and the reset signal (RB); and a 4-bit up counter 322 with a clock terminal for receiving the second input signal (FH2), with a reset terminal for receiving an output of the first AND gate 321, band with an output terminal for producing a 4-bit counting signal (N21 <3:0>).

Figure 4:
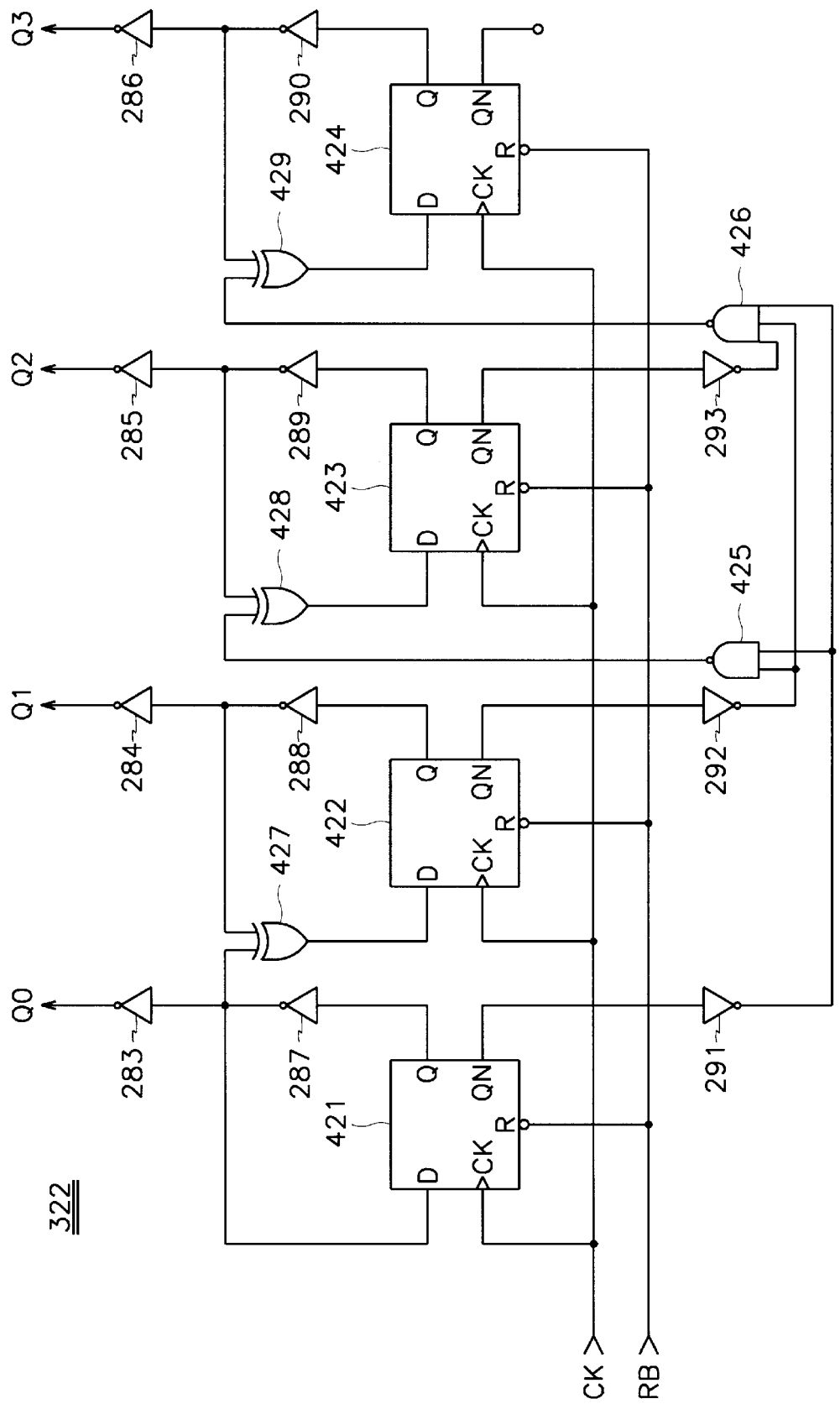
FIG. 4 is a circuit diagram illustrating a 4-bit up counter of controller according to a preferred embodiment of the present invention.

As shown FIG. 4, the 4-bit up counter 322 is composed of a multiple reset flip-flops 421, 422, 423, 424 with an input terminal, a clock terminal, a reset terminal, an output terminal, and an inverted output terminal, respectively; a first NAND gate 425 with two input terminals; a second NAND gate 426 with three input terminals; and multiple exclusive OR gates 427, 428, 429.

The first reset flip-flop 421 receives an inverted signal from inverter 287 of an output of the first reset flip-flop 421 into an input terminal, receives system clock (CK) into a clock terminal, receives reset signal (RB) into a reset terminal, and produces an output signal from an output terminal to inverter 287.

The second reset flip-flop 422 receives an output of the first exclusive OR gate 427 into an input terminal, receives system clock (CK) into a clock terminal, receives reset signal (RB) into a reset terminal, and produces an output signal from an output terminal to inverter 288. The first exclusive OR gate 427 receives an inverted signal of an output of the second reset flip-flop 422 from inverter 288 and an inverted signal of an output of the first reset flip-flop 421 from inverter 287, and produces a high or low logic value in response thereto. A first NAND gate 425 receives an inverted signal of an inverted output of the first reset flip-flop 421 from inverter 291, and an inverted signal of an inverted output of the second reset flip-flop 422 from inverter 292, and produces an output signal.

The third reset flip-flop 423 receives an output of a second exclusive OR gate 428 into an input terminal, receives system clock (CK) into a clock terminal, receives reset signal (RB) into a reset terminal, and produces an output signal from an output terminal to inverter 289. The second exclusive OR gate 428 receives an inverted signal of the output of the third reset flip-flop 423 from inverter 289 and the output of the first NAND gate 425, and produces a high or low logic value in response thereto. The second NAND gate 426 receives an inverted signal of an inverted output of the third reset flip-flop 423 from inverter 293, an inverted signal of an inverted output of the second reset flip-flop 422 from inverter 292, and an inverted signal of an inverted output of the first reset flip-flop 421 from inverter 291, and produces an output signal.

The fourth reset flip-flop 424 receives an output of the third exclusive OR gate 429 into an input terminal, receives system clock (CK) into a clock terminal, receives reset signal (RB) into a reset terminal, and produces an output signal from an output terminal to inverter 290. The third exclusive OR gate 429 receives an output of the second NAND gate 426 and an inverted signal of an output of the fourth reset flip-flop 424 from inverter 290.

Also, the inverted signal of an output of the first reset flip-flop 421 is inverted again by inverter 283 to produce a first output signal (Q0). And the inverted signal of an output of the second reset flip-flop 422 is inverted again by inverter 284 to produce a second output signal (Q1). And the inverted signal of an output of the third reset flip-flop 423 is inverted again by inverter 285 to produce a third output signal (Q2). And then the inverted signal of an output of the fourth reset flip-flop 424 is inverted again by inverter 286 to produce a fourth output signal (Q3).

The third comparator 331 (FIG. 3) with a first comparator terminal (A<3:0>) for receiving a 4-bit counting signal (N21<3:0>) of the second counter 32, with a second comparator terminal (B<3:0>) for setting a fourth bit (B<3>), a third bit (B<2>), a first bit (B<0>) to connect supply voltage Vdd, for setting the second bit (B<1>) to connect ground Vss, compares binary representation of numbers of the first comparator terminal and setting numbers of the second comparator terminal, and then produces a high logic value through an output terminal (EQ) if two numbers are the same, or produces a low logic value if not. The third comparator 331 receives an output of the second counter 32, and a 4-bit input data to direct a representation of the vertical synchronizing signal, compares with them, and produces a high logic value or a low logic value.

Also, the reset circuit 34 is composed of a reset flip-flop 341 with an input terminal, with a clock terminal, with a reset terminal, and with an output terminal, and a AND gate 343 with two input terminals. The reset flip-flop 341 receives the output of the third comparator 33 into an input terminal, receives system clock (CK) into a clock terminal, receives reset signal (RB) into a reset terminal, and produces an output signal from an output terminal. The AND gate 343 receives an inverted signal of an output of the reset flip-flop 341 and the reset signal (RB). Or, the reset circuit 34 receives an output of the third comparator 331, and resets the output circuit of vertical synchronizing signal.

Therefore, a device for generating a vertical synchronizing signal operates according to a preferred embodiment of the present invention as follows.

The counter 12 receives the reset signal (RB), system clock (CK), the feedback signal (INHB), the first input signal (FSS), and produces the 9-bit counting signal (N<8:0>). If the reset signal (RB) is a low logic value, all output bits of the 9-bit counting signal (N<8:0>) are set to high logic values to initialize the system. The counter 12 starts to count in the backward direction if the first input signal (FSS) is a low logic value, while the counter 12 counts in the forward direction if the first input signal (FSS) is a high logic value. The feedback signal (INHB) prevents a counting value of the counter 12 from rotating between an upper limit number 511 and a lower limit number 0.

If the feedback signal (INHB) is a low logic value, an output of the counter 12 is fixed. Also, the feedback signal (INHB) is a low logic value when the 9-bit counting signal (N<8:0>) arrives at the upper limit number or the lower limit number. If the counter 12 has counted in the forward direction, it is only able to count in the backward direction afterwards, and if it has counted in the backward direction, it is only able to count in the forward direction.

The first comparator 13 receives the 9-bit counting signal (N<8:0>), and produces a high logic value if a binary representation of number of the 9-bit counting signal (N<8:0>) is 511, otherwise produces a low logic value.

The second comparator 14 receives the 9-bit counting signal (N<8:0>), and produces a high logic value if a binary representation of number of the 9-bit counting signal (N<8:0>) is 0, otherwise produces a low logic value.

As shown in FIG. 1, if an output X1 of the first comparator 13 is a high logic value (i.e., when the binary representation of number of 9-bit counting signal (N<8:0>) is 511, the first AND gate 112 produces a high logic value). And if the first input signal (FSS) is a high logic value, the second AND gate 113 produces a low logic value. In these cases, a NOR gate 114 produces a low logic value of the feedback signal (INHB) into the counter 12.

If an output X2 of the second comparator 14 is a high logic value (i.e., when a binary representation of number of 9-bit counting signal (N<8:0>) is 0), the second AND gate 113 produces a high logic value. If the first input signal (FSS) is a low logic value, the first AND gate 112 produces a low logic value. In these cases, the NOR gate 114 produces a low logic value of the feedback signal (INHB) into the first counter 12.

The controller 15 produces the vertical synchronizing signal (VS), or an output signal of the first reset flip-flop 313 according to the MSB (N<8>: or LVL) of the 9-bit a counting signal (N<8:0>).

As shown in FIG. 3, since the ninth bit (LVL) is MSB of the 9-bit counting signal (N<8:0>) to cause an undesirable glitched-signal, it is rectified by the first flip-flop 312 which is to prevent a glitch signal from malfunctioning. Then the rectified signal is used to be a clock of the first reset flip-flop 313. An output of the 4-bit up-counter 322 initializes a low logic value according to the reset signal (RB), and the first reset flip-flop 313 produces a high logic value according to the ninth bit (LVL) of 9-bit counting signal (N<8:0>). The 4-bit up counter 322 starts to count in the forward direction the moment a vertical synchronizing signal (VS) is in a high logic value.

The second input signal (FH2) is used as a clock of the 4-bit up-counter 322, and since it is a periodical signal of two pulses per a horizontal line. It is a timing width of one horizontal video line which acquires two output signals of 4-bit up-counter 322.

The third comparator 331 compares the digital number of the first comparator terminal(A<3:0>) with the digital number of a second comparator terminal(B<3:0)>, and it produces a high logic value if they are the same numbers. The second comparator terminal (B<3:0>) of the third comparator 331 is 13 ($1101_2$) of digital number since it is hardcoding as a fourth bit (B<3>), a third bit (B<2>), and a first bit (B<0>) connected supply voltage (Vdd), the second bit (B<1>) connected ground (Vss).

The moment the output of 4-bit up counter 322 becomes 13, or the moment 6 and ½ of horizontal video lines passes after the vertical synchronizing signal (VS) is produced a high logic value, the third comparator 331 produces a low logic value. After the low logic value transmits through reset circuit 34, a reset terminal of the first reset flip-flop 313 receives a low logic value. When the output of first reset flip-flop 313 is a low logic value again, a vertical synchronizing signal (VS) is indeed completed.

Also, if a pulse width of the vertical synchronizing signal(VS) for the final output of the present invention is to change, as shown in FIG. 3, the hard-coding digital number 13 of second comparator terminal (B<3:0>) must change and be transmitted to the third comparator 331.

As shown FIG. 1, input signals according to the embodiment of the present invention are the first input signal (FSS), the second input signal (FH2), the system clock (CK), and the reset signal (RB), with an output signal being the vertical synchronizing signal(VS).

Here, on a basis of 32 binary representation of levels of a video signal, the first input signal (FSS) is a high logic value if a digital level is higher than 32, and is a low logic value if digital level is lower than 32. The second input signal (FH2) is a signal of two pulses per a horizontal video line, and the reset signal (RB) initializes parts of the system when it is a low logic value.

As the system clock (CK) is a main clock of the system, the system needs 1716 sampling clocks if it needs 858 pixels per a horizontal video line. Since width of a horizontal video line is about 63.555 us, system clock CK is up to 27 MHz of frequency.

After the counter 12 with an input terminal receiving the first input signal (FSS) is initialized by the reset signal (RB), it starts to count in the backward direction if only the first input signal (FSS) is a low logic value. It starts to count in the forward direction if only the first input signal (FSS) is a high logic value.

Since an output of the first comparator 13 is a high logic value according to digital number 511 when it is initialized by the reset signal (RB), the feedback signal (INHB) of the counter 12 becomes a low logic value according to the first comparator 13. Here, although the first input signal (FSS) is a high logic value, the cycle count is not increased.

If the counter 12 receives signals of areas in which the first input signal (FSS) is in a low logic state, counting numbers of the 9-bit counting signal (N<8:0>) goes down from 511. Then if the counter 12 receives signals of areas in which the first input signal (FSS) is high logic values again, the cycle count represented by the 9-bit counting signal increases incrementally in the forward direction from the present count to a maximum of 511, and if the count is up to 511, any further increase is inhibited by said first comparator 13.

As signals of the area in which the first input signal (FSS) is in a low logic state go down, the cycle count arrives at the lower limit number 0. In this case, the feedback signal (INHB) becomes a low logic value, and any further decrease is inhibited by the second comparator 14.

If the counter counts in the backward direction 256 of low logic values from 511 after receiving the reset signal (RB), the MSB (N<8>) of the 9-bit counting signal (N<8:0>) changes from a high logic value into a low logic value, and an area of the final output is shown in which the vertical synchronizing signal (VS) is a high logic value according to the controller 15. This is indeed a vertical synchronizing signal of a video signal.

Here, the area in which the first input signal (FSS) is a low logic value in a video signal, is typically wider in a vertical synchronizing area than in a horizontal synchronizing area.

Moreover, in the area of a horizontal synchronizing signal, the low area of the first input signal (FSS) is less than a maximum 5 us according to a format of video signal, and the area of the vertical synchronizing signal is wider than the low area of the first input signal (FSS) than the area of the horizontal synchronizing signal.

Therefore, since the MSB (N<8>) of 9-bit counting signal (N<8:0>) is initialized at a high logic value according to binary representation of number 511 by the reset signal (RB), it will have to be counted 256 system clocks in the backward direction so that the MSB (N<8>) changes from a high logic value into a low logic value. Since a 27 MHz system clock (CK) has 37 ns per period, the counter 12 counts in the backward direction so that the low area of the first input signal (FSS) continues 9.472 us(=256*37 ns) long, and it is assured that a video signal is in area of the vertical synchronizing signal, or regarding about 10 us low area of the first input signal (FSS) as a starting basis for vertical synchronizing signal, it produces a high logic value for vertical synchronizing signal (VS) in a video signal through the final output terminal the moment to be the starting basis. Consequently, it is produced a high logic value of the vertical synchronizing signal (VS) in only vertical synchronizing area.

Figure 5:
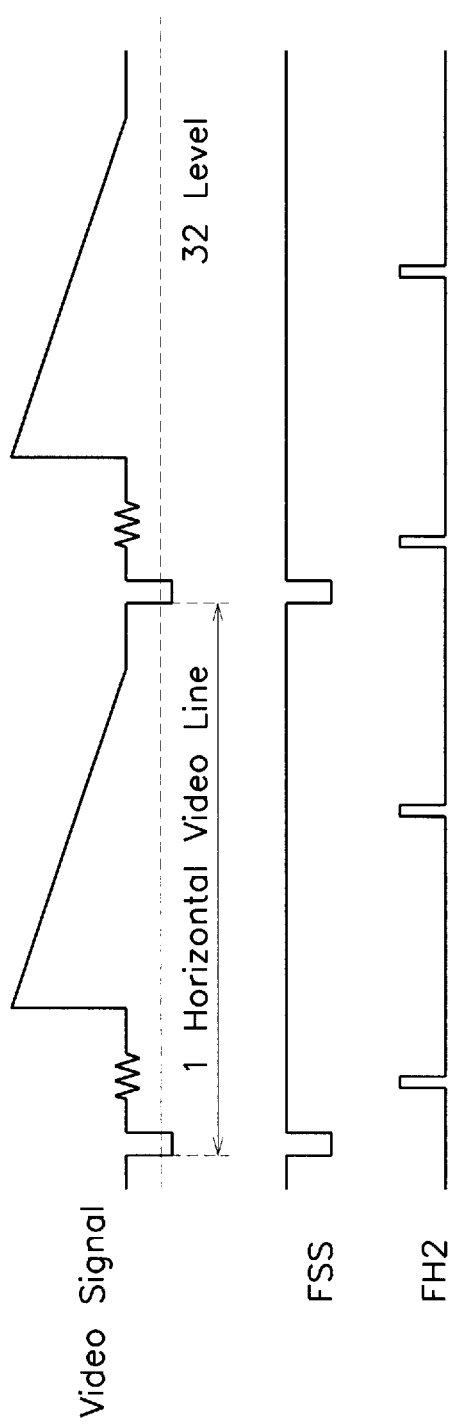
FIG. 5 is a timing diagram illustrating the relationship between a first input signal (FSS), a second input signal (FH2), and a horizontal video line according to a preferred embodiment of the present invention.

As shown in FIG. 5, the first input signal (FSS) is a high logic value when a digital level of a video signal is more than 32, and that the first input signal (FSS) is a low logic value when a digital level of video signal is less than 32. Also, it is shown that the second input signal (FH2) is to need two signals per a horizontal video line.

Figure 6:
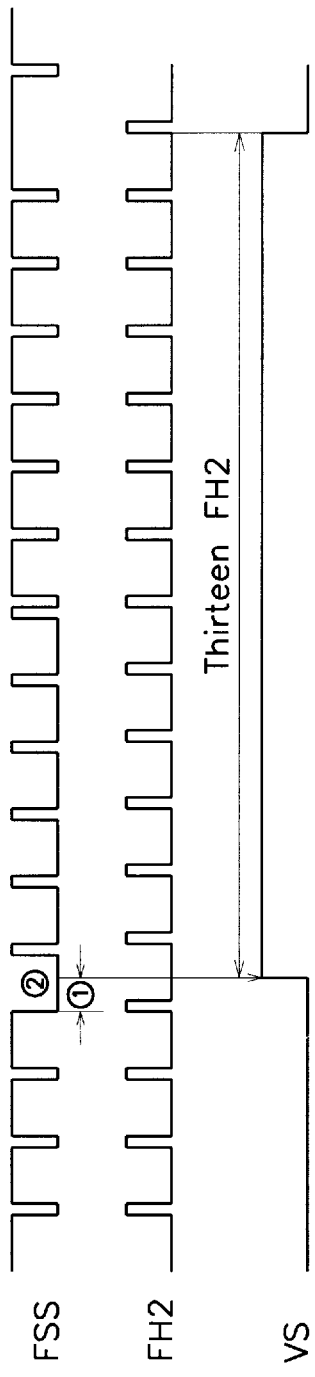
FIG. 6 is a timing diagram illustrating the relationship between a first input signal (FSS), a second input signal (FH2), and a vertical synchronizing signal (VS).

As shown in FIG. 6, a mark (1) displays that the low area of the first input signal (FSS) is counted by the counter 12, and that a vertical synchronizing signal (VS) starts to acknowledge so wide range that 256 system clocks can be continued to count in the backward direction. A mark (2) displays a starting basis of the vertical synchronizing signal (VS) to be a high logic value according to the second counter 322 of the controller 15. When the second input signal (FH2) becomes 13, the vertical synchronizing signal (VS) is a high logic value, and then is indeed completed.

In conclusion, the effect of the present invention can be summarized that it can be to easily correct a vertical synchronizing signal by providing a device which generates a vertical synchronizing signal of video signals by digital methods correspondence with users' requests, and it can be not only to advance a stability in the process by comprising digital circuits, but also to operate lower consumption-current than analog circuits.

It is understood that various other modification will be apparent to and can be readily made by those skilled in the art without departing from the scope and spirit of this invention. Accordingly, it is not intend that the scope of the claims appended hereto be limit to the description as set forth herein, but rather that the claims be construed as encompassing all the features of patentable novelty that reside in the present invention, including all features that would be treated as equivalents thereof by those skilled in the art which this invention pertains.

What is claimed is:

1. A device for generating a vertical synchronizing signal comprising a counter for receiving a first input signal and a system clock, and for counting a number of cycles of the system clock and producing a 9-bit counting signal in response thereto;

a first comparator for receiving the 9-bit counting signal, comparing it with an upper limit number, and producing an output signal;

a second comparator for receiving the 9-bit counting signal, comparing it with a lower limit number, and producing an output signal;

a feedback loop circuit for receiving the first input signal, the output signal of said first comparator, and the output signal of said second comparator, and producing a feedback signal to prevent outputs of said counter from exceeding the upper and lower limit numbers; and a controller for receiving the most significant bit (MSB) of the 9-bit counting signal, the system clock, and a second input signal, and producing a vertical synchronizing signal where the MSB has a low logic value when the counter counts system clocks in the descending direction from the upper limit number.

2. A device for generating a vertical synchronizing signal according to claim 1 wherein, the first input signal is a high logic value if a digital level of an input video signal is higher than 32.

3. A device for generating a vertical synchronizing signal according to claim 1 wherein, a starting point of the vertical synchronizing signal is recognized from a width of low logic values when the counter counts 256 system clock cycles in the descending direction from the upper limit number.

4. A device for generating a vertical synchronizing signal according to claim 1 wherein, said first comparator compares the 9-bit counting signal with an upper limit number binary representation of of 511.

5. A device for generating a vertical synchronizing signal according to claim 1 wherein, the second comparator compares the 9-bit counting signal with the lower limit number binary representation of 0.

6. A device for generating a vertical synchronizing signal according to claim 1 wherein, said counter is an up/down counter which counts in the ascending direction if the first input signal has a high logic value, or counts in the descending direction if the first input signal has a low logic value.

7. A device for generating a vertical synchronizing signal according to claim 1 wherein, said counter starts to count if the feedback signal is a high logic value, stops to count if the feedback signal is a low logic value.

8. A device for generating a vertical synchronizing signal according to claim 6 wherein, said counter is a 9-bit up/down counter which comprises multiple reset flip-flops with an input terminal, a clock terminal, a reset terminal, and an output terminal, multiple exclusive OR gates, multiple AND gates, multiple OR gates, and multiple exclusive NOR gates.

9. A device for generating a vertical synchronizing signal according to claim 1 wherein the feedback loop circuit comprises:

a first AND gate receiving the output of said first comparator, and the first input signal;

a second AND gate receiving an inverted signal of the first input signal and the output of said second comparator;

a NOR gate receiving outputs of the two AND gates, and producing the feedback signal.

10. A device for generating a vertical synchronizing signal according to claim 1, wherein said counter starts to count in the descending direction if the counter arrives at the upper limit number, and the counter starts to count in the ascending direction if the counter arrives at the lower limit number.

11. A device for generating a vertical synchronizing signal according to claim 1 wherein the controller comprises:

an output circuit for a vertical synchronizing signal, said output circuit for receiving the MSB of the 9-bit counting signal, and producing a high logic value of the vertical synchronizing signal if the MSB of 9-bit counting signal is a low logic value when said counter counts the number of cycles of the system clock in the descending direction from the upper limit number;

second counter for receiving an output of said output circuit for the vertical synchronizing signal and the second input signal, and for counting to synchronize with the second input signal when the output of the output circuit for vertical synchronizing signal is a high logic value;

a third comparator for receiving an output of the second counter, and a 4-bit input data to direct a representation of the vertical synchronizing signal to produce a high logic value or a low logic value;

a reset circuit for receiving the output of said third comparator, and for resetting the output circuit for vertical synchronizing signal.

12. A device for generating a vertical synchronizing signal according to claim 11 wherein, said output circuit for the vertical synchronizing signal is a reset flip-flop with an input terminal connected to a supply voltage, with a clock terminal receiving an inverted output of the MSB, and with a reset terminal connected to an output of said reset circuit.

13. A device for generating a vertical synchronizing signal according to claim 11 wherein said second counter comprises:

a first AND gate for receiving the output of the output circuit for the vertical synchronizing signal, and a reset signal;

a 4-bit up counter with a clock terminal for receiving the second input signal; and a reset terminal for receiving an output of the first AND gate.

14. A device for generating a vertical synchronizing signal according to claim 13 wherein said 4-bit up counter comprises:

a first reset flip-flop with an input terminal for receiving an inverted signal of an output of the first reset flip-flop, with a clock terminal for receiving the system clock, with a reset terminal for connecting the reset signal, and with an output terminal for producing a first output signal;

a first exclusive OR gate for receiving an inverted signal of an output of a second reset flip-flop and an inverted signal of an output of the first reset flip-flop;

wherein the second reset flip-flop has a clock terminal for receiving the system clock, a reset terminal for connecting the reset signal, an input terminal for receiving an output of the first exclusive OR gate, and an output terminal for producing a second output signal;

a first NAND gate with two input terminals for receiving an inverted signal of an inverted output of the first reset flip-flop and an inverted signal of an inverted output of the second reset flip-flop;

a second exclusive OR gate for receiving an inverted signal of an output of a third reset flip-flop and output of the first NAND gate;

wherein the third reset flip-flop has a clock terminal for receiving the system clock, said third reset flip-flop having a reset terminal for connecting the reset signal, an input terminal for receiving an output of the second exclusive OR gate, and an output terminal for producing a third output signal;

a second NAND gate with three input terminals for receiving an inverted signal of an inverted output of the third reset flip-flop, an inverted signal of an inverted output of the second reset flip-flop, and an inverted signal of an inverted output of the first reset flip-flop;

a third exclusive OR gate for receiving an output of the second NAND gate, and an inverted signal of an inverted output of a fourth reset flip-flop; and the fourth reset flip-flop having a clock terminal for receiving system clock, a reset terminal for connecting the reset signal, an input terminal for receiving an output of the third exclusive OR gate, and an output terminal for producing a fourth output signal.

15. A device for generating a vertical synchronizing signal according to claim 11 wherein, said third comparator compares the output of the second counter with the 4-bit input data, produces a high logic value if the two are the same, and produces a low logic value otherwise.

16. A device for generating a vertical synchronizing signal according to claim 11 wherein said reset circuit comprises:

a reset flip-flop having an input terminal for connecting an output of the third comparator, a clock terminal for receiving the system clock, a reset terminal for connecting a reset signal; and an AND gate for receiving an inverted signal of an output of the reset flip-flop and the reset signal, and producing a high or a low logic value.

17. A device for generating a vertical synchronizing signal according to claim 12 wherein the output circuit for vertical synchronizing signal further comprises:

a first flip-flop having an input terminal for receiving an inverted signal of the MSB, a clock terminal for receiving the system clock, and an output terminal for producing a glitch-removed signal which is synchronized with the system clock.

* * * * *